(12) United States Patent
Eruhimov et al.

(10) Patent No.: US 7,676,105 B2
(45) Date of Patent: Mar. 9, 2010

(54) METHOD, APPARATUS, ARTICLE AND SYSTEM FOR USE IN ASSOCIATION WITH IMAGES

(75) Inventors: Victor L. Eruhimov, Nizhny Novgorod (RU); Alexander D. Krahknov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 11/141,422

(22) Filed: May 31, 2005

(65) Prior Publication Data

US 2006/0269157 A1    Nov. 30, 2006

(51) Int. Cl.
G06K 9/46 (2006.01)
G06K 9/32 (2006.01)
H04N 7/12 (2006.01)

(52) U.S. Cl. .................. 382/243; 382/233; 382/299; 348/422.1; 375/240.08

(58) Field of Classification Search ......... 382/232–253, 382/254, 298, 299, 300; 345/606; 375/240, 375/240.01, 240.08, 240.09, 240.1, 240.11, 375/240.21, 240.25; 708/203; 348/384.1, 348/390.1, 397.1, 399.1, 422.1
See application file for complete search history.

(56) References Cited

U.S. PATENT DOCUMENTS

| | | | |
|---|---|---|---|
| 5,065,149 A * | 11/1991 | Marsh et al. | 345/698 |
| 5,539,452 A * | 7/1996 | Bush et al. | 348/14.13 |
| 5,689,436 A * | 11/1997 | Takeuchi | 375/240.01 |
| 6,633,677 B1 | 10/2003 | Dube et al. | |
| 6,697,526 B1 * | 2/2004 | Abe | 382/232 |
| 6,766,067 B2 * | 7/2004 | Freeman et al. | 382/299 |
| 6,782,143 B1 | 8/2004 | Dube et al. | |
| 2003/0174769 A1 * | 9/2003 | Nagumo et al. | 375/240.02 |
| 2008/0152002 A1 | 6/2008 | Haque et al. | |
| 2008/0162879 A1 | 7/2008 | Jiang | |

OTHER PUBLICATIONS

Freeman, W.T., et al. (Apr. 2002) "Example-based super-resolution." IEEE Computer Graphics and Applications, vol. 22 No. 2, pp. 56-65.*
Dalley, G., et al. (Oct. 2004) "Single-frame text super-resolution: a Bayesian approach." Int'l Conf. on Image Processing 2004, vol. 5, pp. 3295-3298.*
Bishop, C.M., et al. (Jan. 2003) "Super-resolution enhancement of video." Proc. of 9th Int'l Workshop on Artificial Intelligence and Statistics.*
Kong et al. (Sep. 2006) "Video super-resolution with scene-specific priors." 2006 British Machine Vision Conf. pp. 549-558.*

(Continued)

*Primary Examiner*—Bhavesh M Mehta
*Assistant Examiner*—Barry Drennan
(74) *Attorney, Agent, or Firm*—Buckley, Maschoff & Talwalkar LLC

(57) ABSTRACT

According to some embodiments, a set of images may be determined, including at least one training image and at least one image to be provided to a viewer. A reduced training image may be created based on the training image, and at least one enlarging parameter may be calculated based on a portion of the training image and a corresponding portion of the reduced training image. The enlarging parameter may then be used to facilitate an enlargement of a reduced image to be provided to the viewer.

27 Claims, 7 Drawing Sheets

OTHER PUBLICATIONS

Molina et al. (Jan. 2006) "Towards a new video compression scheme using super-resolution." Proc. SPIE vol. 6077, pp. 67-79.*

Segall et al. (Jul. 2004) "Bayesian resolution enhancement of compressed video." IEEE Trans. on Image Processing, vol. 13 No. 7, pp. 898-911.*

William T. Freeman, Egon C. Pasztor and Owen T. Carmichael, "Learning Low-Level Vision", International Journal of Computer Vision 40(1), 25-47, 2000, © 2000 Kluwer Academic Publishers. Manufactured in The Netherlands.

Simon Baker and Takeo Kanade, "Limits on Super-Resolution and How to Break Them", IEEE Transactions on Pattern Analysis and Machine Intelligence, vol. 24, No. 9, Sep. 2002, pp. 1167-1183.

Friedman, Jerome H., "Stochastic Gradient Boosting", Mar. 26, 1999, pp. 1-10.

* cited by examiner

METHOD, APPARATUS, ARTICLE AND SYSTEM FOR USE IN ASSOCIATION WITH IMAGES

BACKGROUND

Image information may be transmitted from a one device to another device via a communication network. For example, a Personal Computer (PC) might send a stream of video images to a viewer at a remote PC via the Internet. Because the rate at which image information can be transmitted may be limited (e.g., by a PC's modem), it may be desirable to reduce the amount information that needs to be transmitted. Moreover, it may be desirable to reduce the amount of information without degrading the quality of the image to an unacceptable degree.

DETAILED DESCRIPTION

Figure 1:
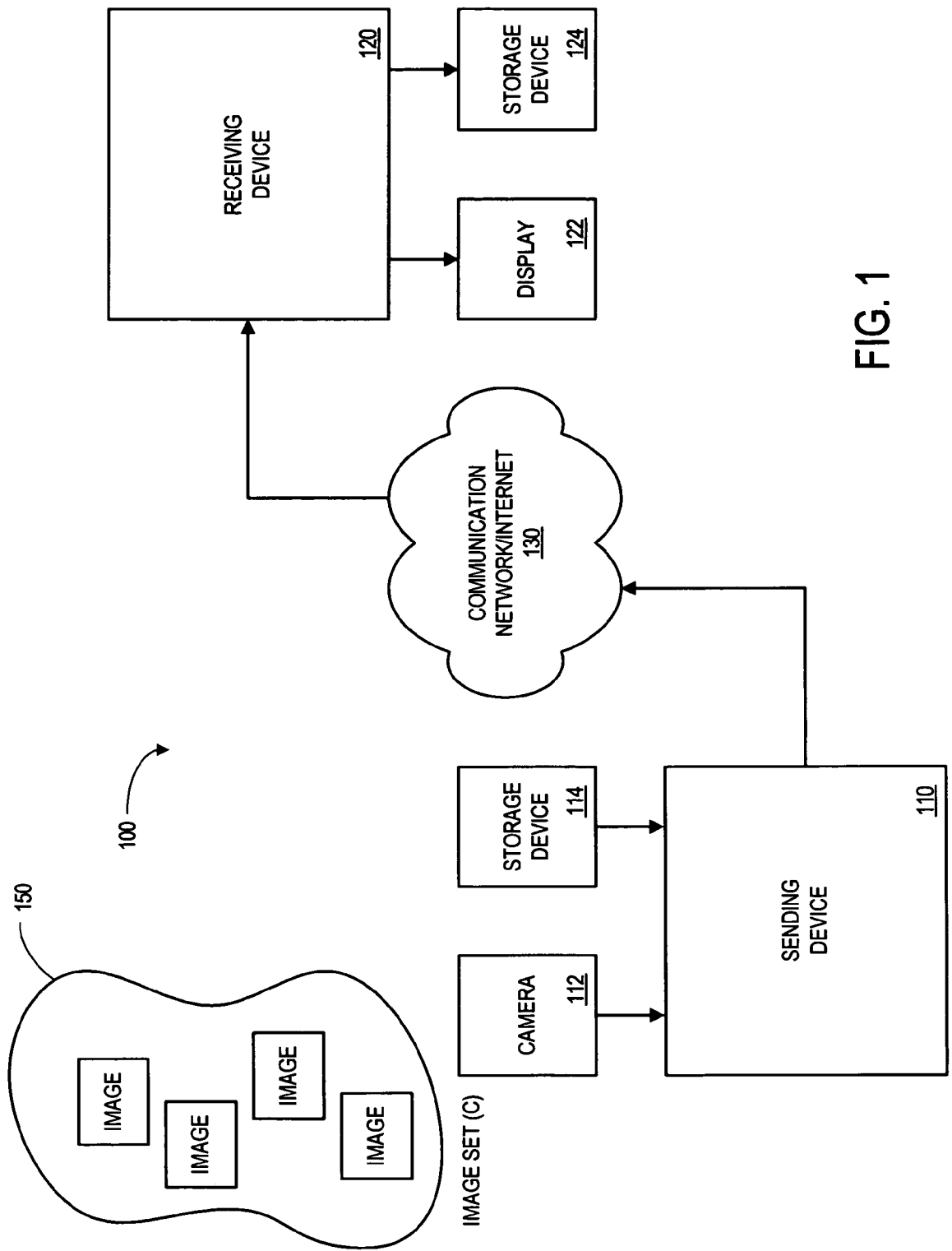
FIG. 1 is a block diagram of an image transmission system according to some embodiments.

Image information may be transmitted from one device to another device via a communication network. For example, FIG. 1 is a block diagram of an image transmission system 100 according to some embodiments. As used herein, the phrase "image information" may refer to a single picture or a video associated with a series of pictures. The image information might be sent in accordance with, for example, a Joint Photographic Experts Group (JPEG) protocol.

The system 100 includes a sending device 110 that is to send information associated with a set of images 150 within a "class" C. The images 150 within class C may, for example, contain common or similar features (e.g., the same face and/or background). According to some embodiments, the sending device 110 is a PC that receives the set of images 150 from a camera 112 (e.g., a Web camera). According to other embodiments, the sending device 110 receives the images from a storage device 114 (e.g., a hard drive, a memory unit, or a Compact Disk (CD) drive). Other examples of sending devices 110 include a mobile computer, a digital camera (e.g., a security camera), a video camera, a television device (e.g., a set-top box, Digital Video Recorder (DVR), or media center), and a game console.

The sending device 110 sends information about the set of images to a receiving device 120 through a communication network 130. As used herein, the devices 110, 120 may communicate, for example, via a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Note that although a single receiving device 120 is shown in FIG. 1, any number of receiving devices 120 may be included in the system 100 (e.g., the sending device 110 might broadcast image information to a number of different receiving devices 120).

The receiving device 120 may then use the received information about the set of images 150 to provide information to a viewer via a display 122 (e.g., a computer monitor) or and/or store the information via a storage device 124. Note that the receiving device 120 and its associated storage device 124 might be any of the types of devices described with respect to the sending device 110 and its associated storage device 114, respectively.

Figure 2:
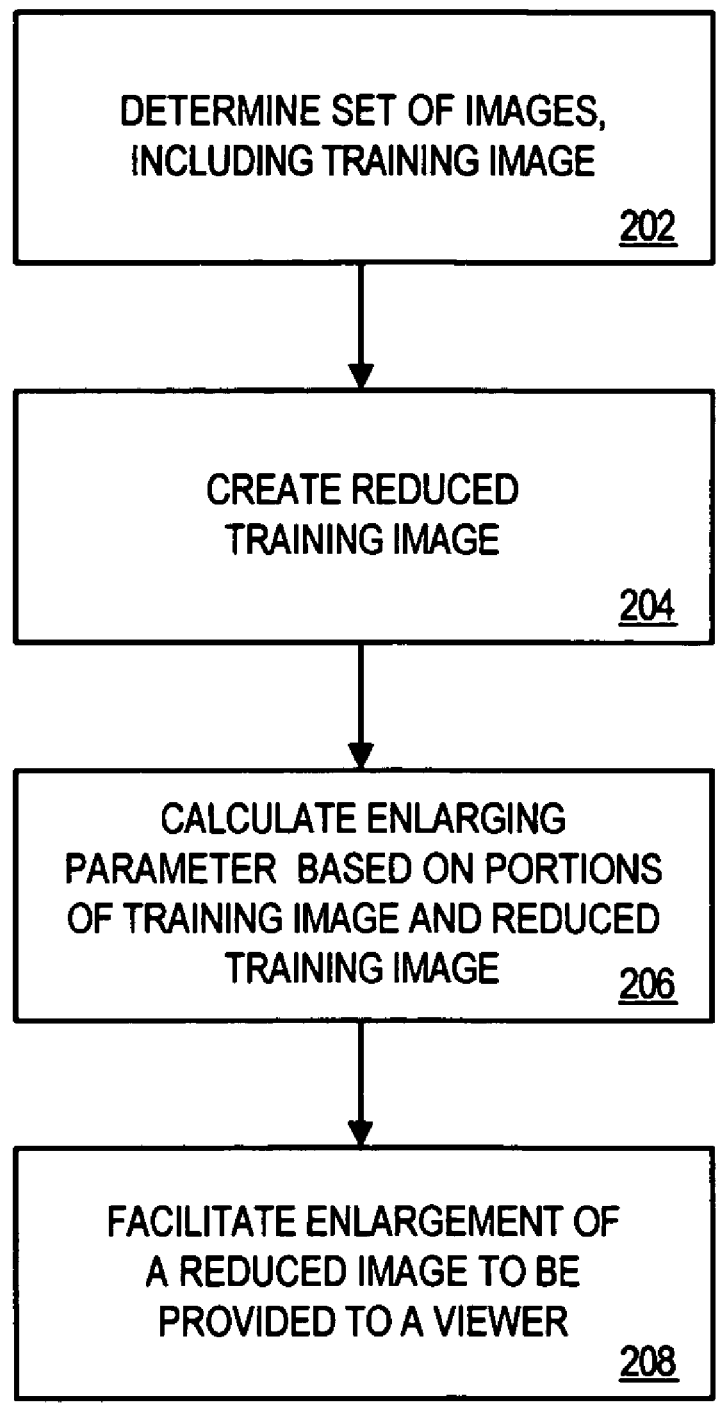
FIG. 2 is a flow chart of a method according to some embodiments.

Because the rate at which image information can be transmitted through the communication network 130 may be limited, it is desirable to reduce the amount information that needs to be transmitted. FIG. 2 is a flow chart of a method according to some embodiments. The method might be performed, for example, by the sending device 110 and/or the receiving device 120 described with respect to FIG. 1. The flow chart does not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, a set of images are determined. The set of images may, for example, be in a class C and share similar characteristics or be otherwise related. Each image may have a pixel width and a pixel height. For example, each image might be 256 pixels wide and 256 pixels high. The set of images includes at least one "training" image. The training image might be selected, for example: (i) randomly, (ii) based on its location in a sequence of images (e.g., every one hundredth image in a sequence might be selected as a training image), or (iii) based on features contained within the training image (e.g., a training image might be selected when a new scene is detected). According to some embodiments, the set of training images are selected by reviewing all of the images to determine which images are "most different" from each other. Note that selecting the first ten frames in a video as training images could delay the presentation of images to a viewer (and might therefore be avoided).

A reduced version of a training image is then created at 204. That is, at least one of the training image's pixel width or pixel height is reduced. For example, a 256×256 training image might be reduced to a 64×64 version of the image. Note that the reduced version represents a lower-resolution or "shrunken" version of the entire original image (and not a "cropped" version).

At 206, at least one enlarging parameter is created based on at least one portion of the original training image and a corresponding portion of the reduced training image. The enlarging parameter might comprise, for example, one or more values associated with a regression model that will be used to enlarge a reduced version of another image (which is in the same class as the training image).

At 208, an enlargement of a reduced (non-training) image to be provided to a viewer is facilitated in accordance with this enlarging parameter. For example, a reduced version of this image might be transmitted to a receiving device via a communication network (and because the image has been reduced, the amount of bandwidth required to transmit the image will be reduced). The receiving device can then use the enlarging parameter to generate a scaled-up or enlarged version of the received image. For example, the receiving device might receive a 64×64 version of an image and use the enlarging parameter to re-create a 256×256 version of the image.

Thus, prior information about images (e.g., the training images) may help a superresolution algorithm (e.g., an enlargement process) provide a high-quality, low-bandwidth image to a viewer. Moreover, strong prior information and machine learning techniques might learn the properties of a generic digital image from those examples (instead of making assumptions about those properties). Note that decreasing the differences within the class C might reduce the bandwidth that is required to provide a high quality image (e.g., because the images in the class are more like each other).

Figure 3:
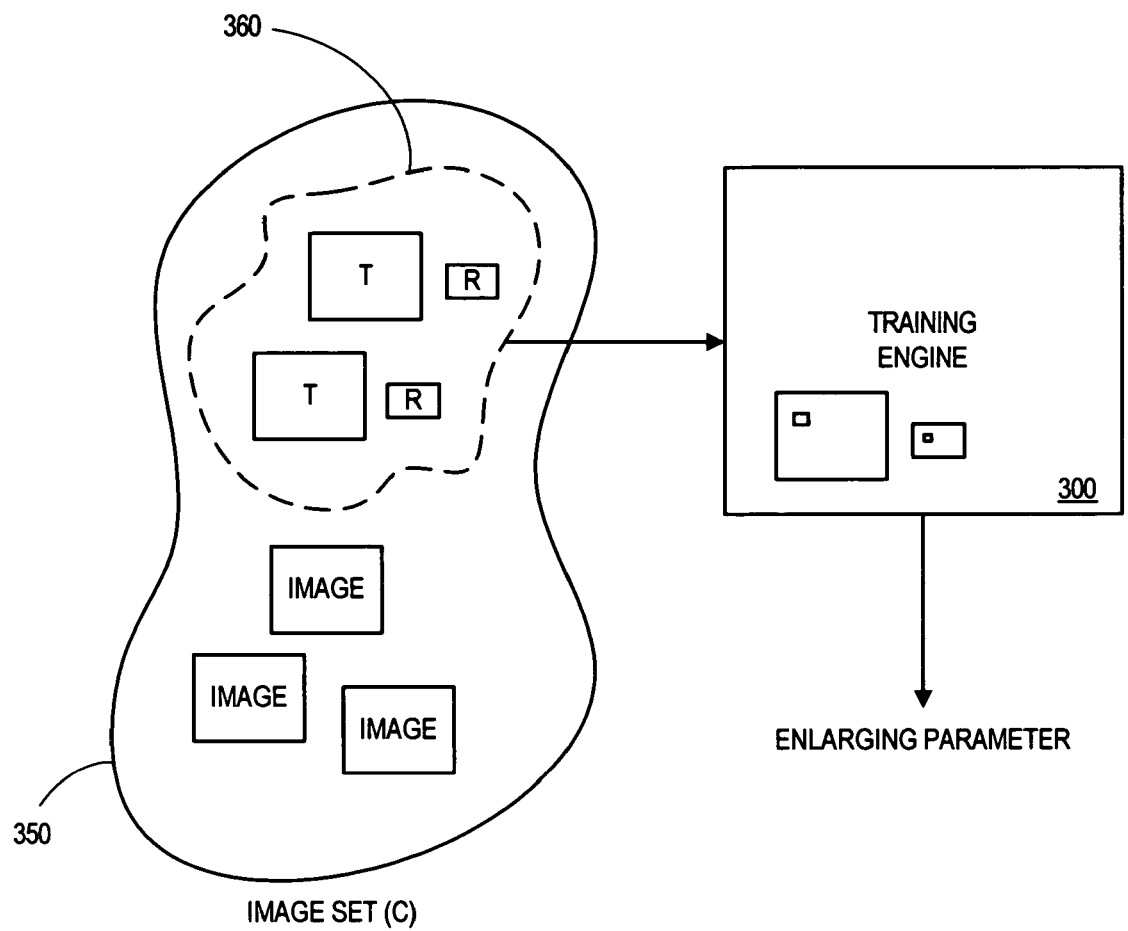
FIG. 3 is a block diagram of a training engine according to some embodiments.

FIG. 3 is a block diagram of a training engine 300 according to some embodiments. The training engine 300 may be used, for example, to facilitate a transmission of a set of images 350 in a class C (e.g., the images might have similar features). A subset 360 of the images 350 may be designated as training images (T) and a reduced version (R) of each training image may be created. The reduced version might be created by the training engine 300 or another device or process. According to some embodiments, low-band information is removed from the training image before the reduced training image is created. Such information might be removed, for example, using filtering, a Gaussian algorithm, and/or a laplacian pyramid algorithm.

A portion of a training image and a corresponding portion of the associated reduced training image are then used by the training engine 300 to generate at least one enlarging parameter. For example, a 4×4 area of the reduced training image (e.g., lower resolution information) and a corresponding 9×9 portion of original training image (e.g., higher resolution information) may be used by the training engine 300 to calculate data to be used later when other images in the class C are enlarged (e.g., scaled-up). The calculation of the enlarging parameter might be associated with, for example, a regression model, a k-nearest neighbor algorithm, a Markov random field algorithm, or a gradient boosting tree algorithm. Note that the portion of the images that are used to generate the parameter might be selected by the training engine 300 (e.g., based on particular features contained within the image).

Figure 4:
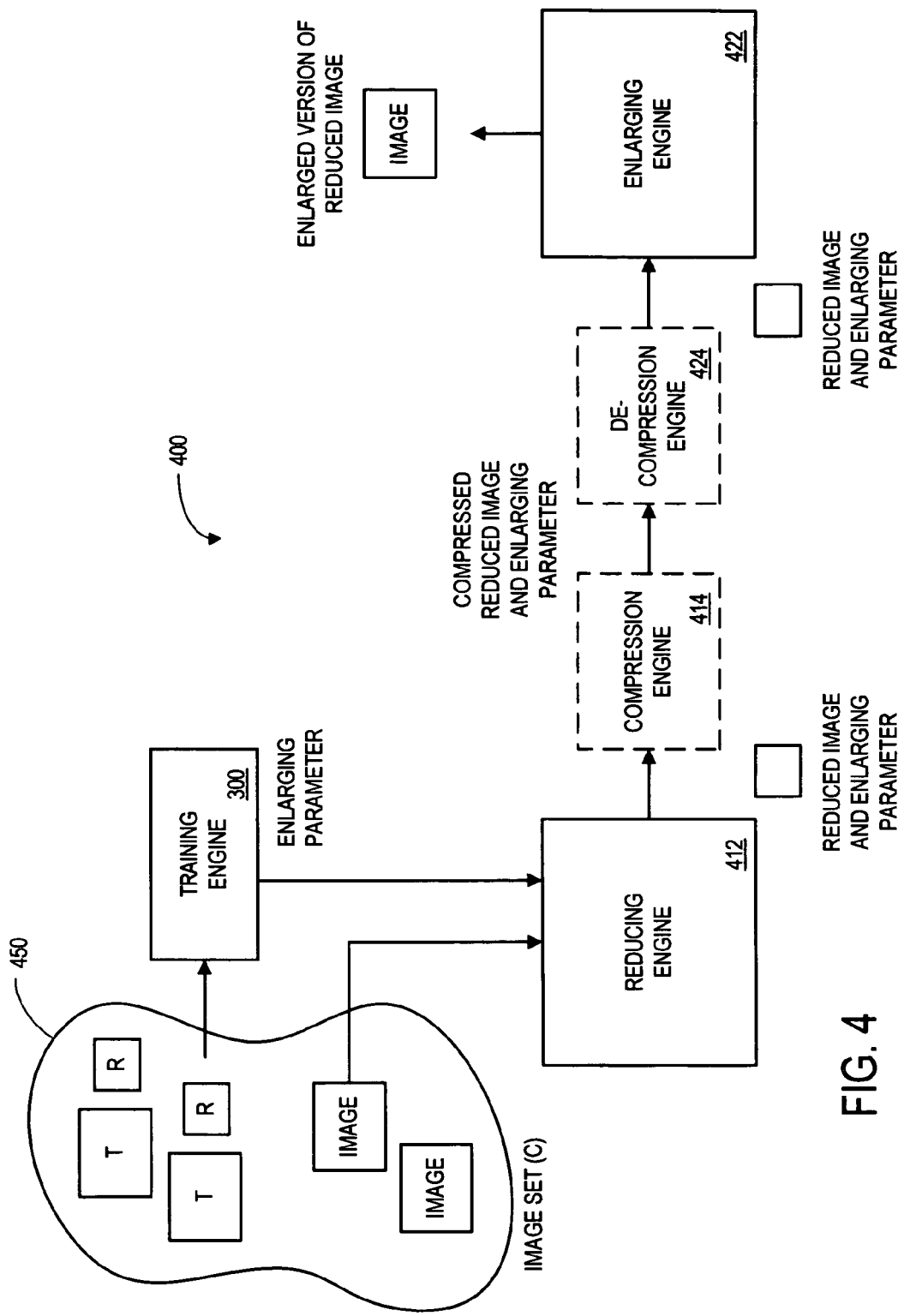
FIG. 4 is a block diagram of a system in which a training engine is associated with a sending device according to some embodiments.

The training engine 300 might be associated with either a sending device or a receiving device. For example, FIG. 4 is a block diagram of a system 400 in which the training engine 300 is associated with a sending device according to some embodiments. In this case, the training engine 300 accesses full-sized training images and reduced versions of those training images from a set of images in a class C. The pairs of images are then used to generate at least one enlarging parameter.

A reducing engine 412 then generates a reduced version of a non-training image to be provided to a viewer. The reduced version of this image is transmitted to a receiving device via a communication network (e.g., to a remote PC) along with the enlarging parameters. An enlarging engine 422 at the receiving device may then use the enlarging parameters along with the reduced version of the image to re-create the original full-sized image. That is, an enlarged version of the (previously) reduced image can be generated and displayed to the viewer. Because only the reduced image was transmitted through the network, the amount of bandwidth required to transmit the image may be reduced.

According to some embodiments, the reduced version of the image is also compressed by a compression engine 414 before being transmitted through the network. In this case, the receiving device might use a de-compression engine 424 to de-compress the reduced version of the image before enlarging it. Such an approach may further reduced the bandwidth used to transmit the image information. The compression engine 414 and decompression engine 424 might be associated with, for example, a JPEG protocol or the Moving Pictures Expert Group (MPEG) Release Four (MPEG-4) 14496 (1999/2002) standard published by the International Standards Organization (ISO) and the International Electrotechnical Commission (IEC).

Figure 5:
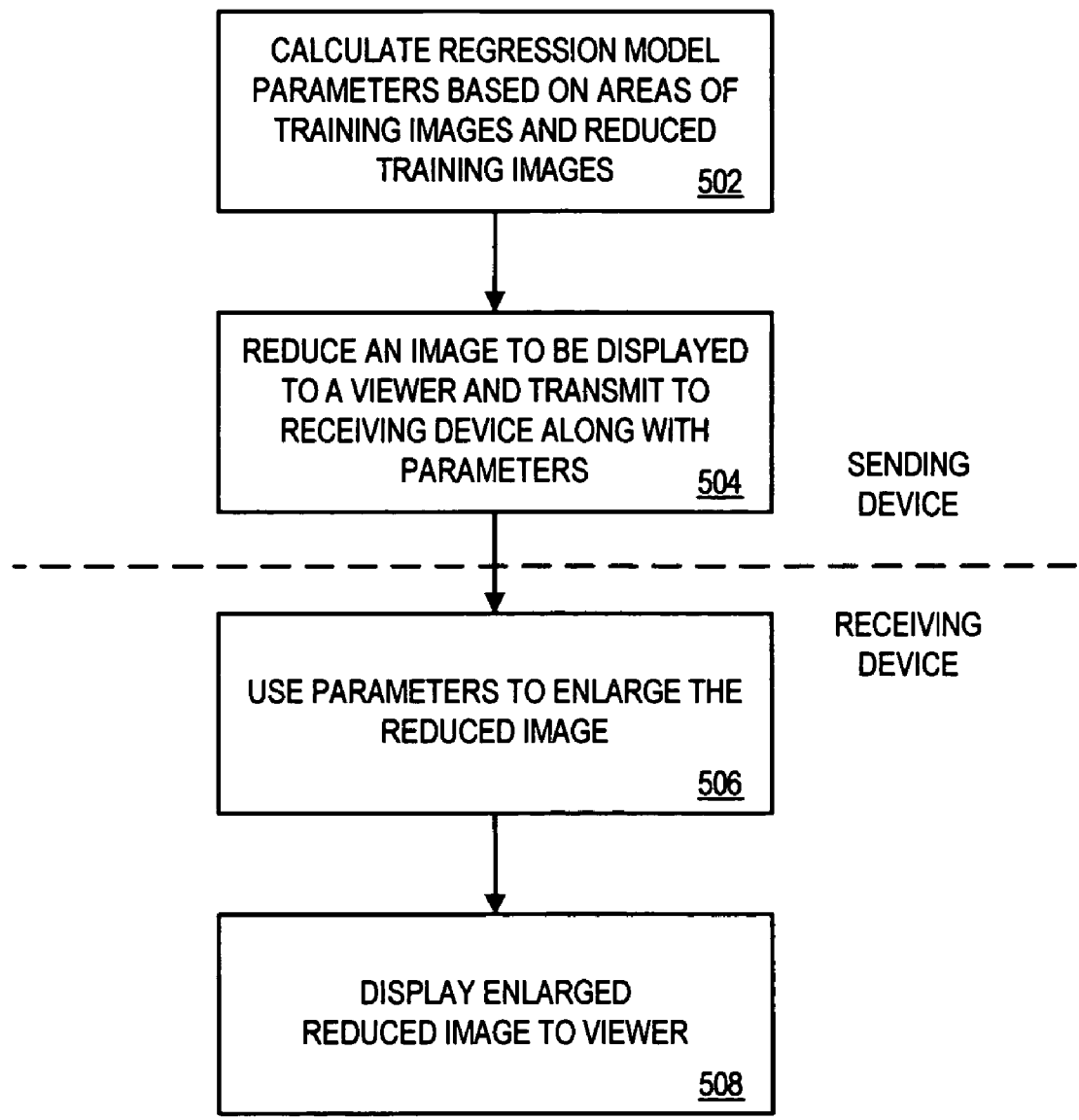
FIG. 5 is a flow chart of a method in which a training engine is associated with a sending device according to some embodiments.

FIG. 5 is a flow chart of a method in which a training engine is associated with a sending device according to some embodiments. At 502, regression model parameters are calculated based on areas of training images (e.g., pictures) and associated areas of reduced versions of the training images. According to some embodiments, information from neighboring pixels are also used when calculating these parameters. At 504, a reduced version of another image, in the same class as the training images, is generated and transmitted to a receiving device along with the parameters. Note that the reduced image might be transmitted to the received device separately from the parameters (e.g., they could even be transmitted via different communication networks).

At 506, the receiving device uses the parameters to create an enlarged version of the reduced image. That is, data gathered based on the training images can be used to intelligently up-scale other images that are in the same class. The enlarged version of the reduced image is then provided to a viewer at 508 (e.g., by displaying the image on a computer monitor).

Figure 6:
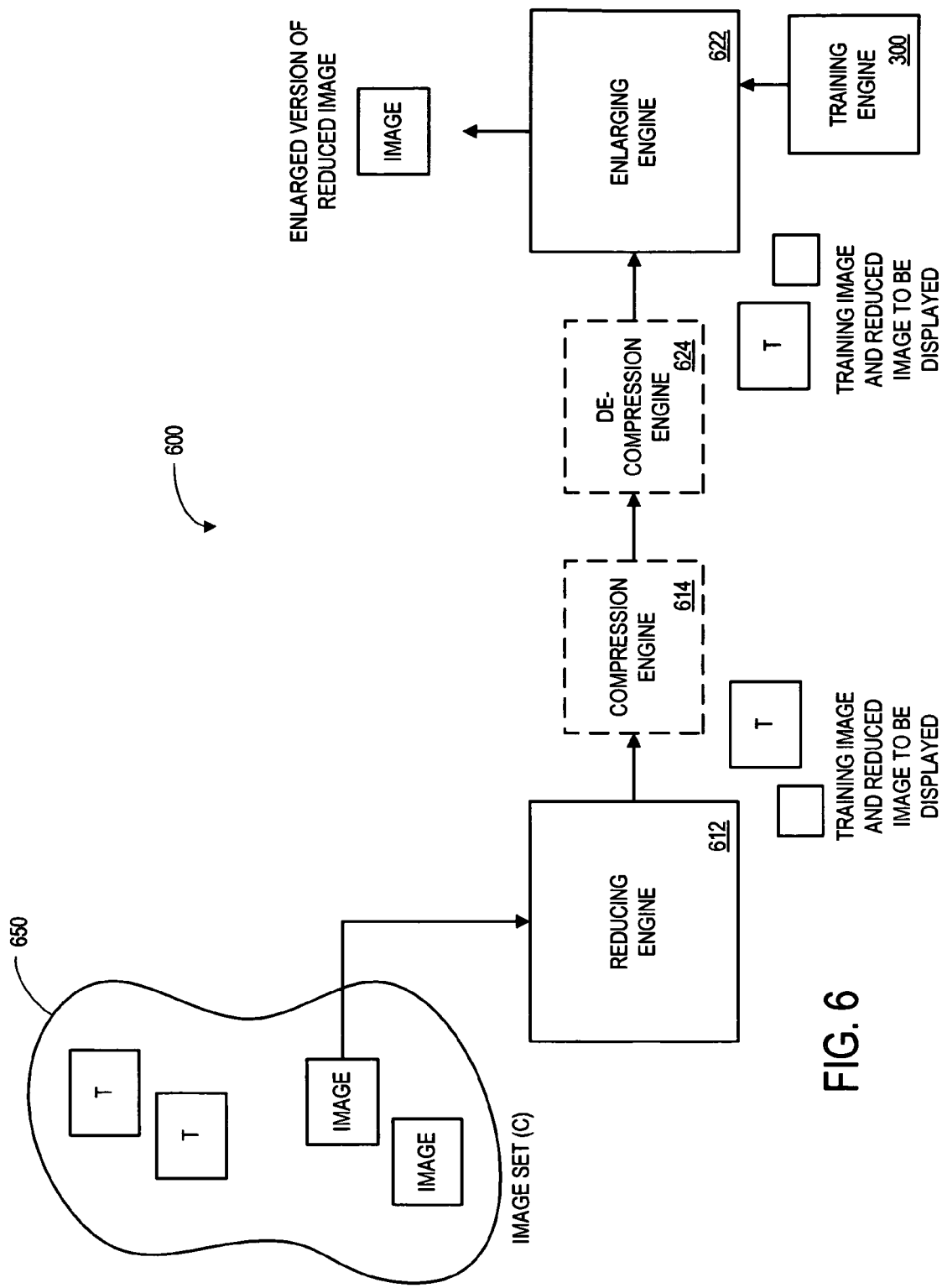
FIG. 6 is a block diagram of a system in which a training engine is associated with a receiving device according to some embodiments.

According to another embodiment, a training engine is instead associated with a receiving device. For example, FIG. 6 is a block diagram of a system 600 in which a training engine 300 is associated with a receiving device. In this case, the sending device transmits a full-sized version of a training image to the receiving device. In addition, reduced versions of other images in the same class are generated by a reducing engine 612 and transmitted to the receiving device. The training engine 300 then uses information associated with the full-scale training image and a reduced version of the training image to generate enlarging parameters. Note that the reduced version of the training image might have been generated by the reducing engine 612 or, in another embodiment, by the training engine 300 or some other process associated with the receiving device. As before, an enlarging engine 622 can use the enlarging parameters to re-create an enlarged version of the image to be displayed to a viewer. According to some embodiments, the training images and/or the reduced versions of other images may be compressed by a compression engine 414 before being transmitted through the network (and then be de-compressed by a de-compression engine 424).

Figure 7:
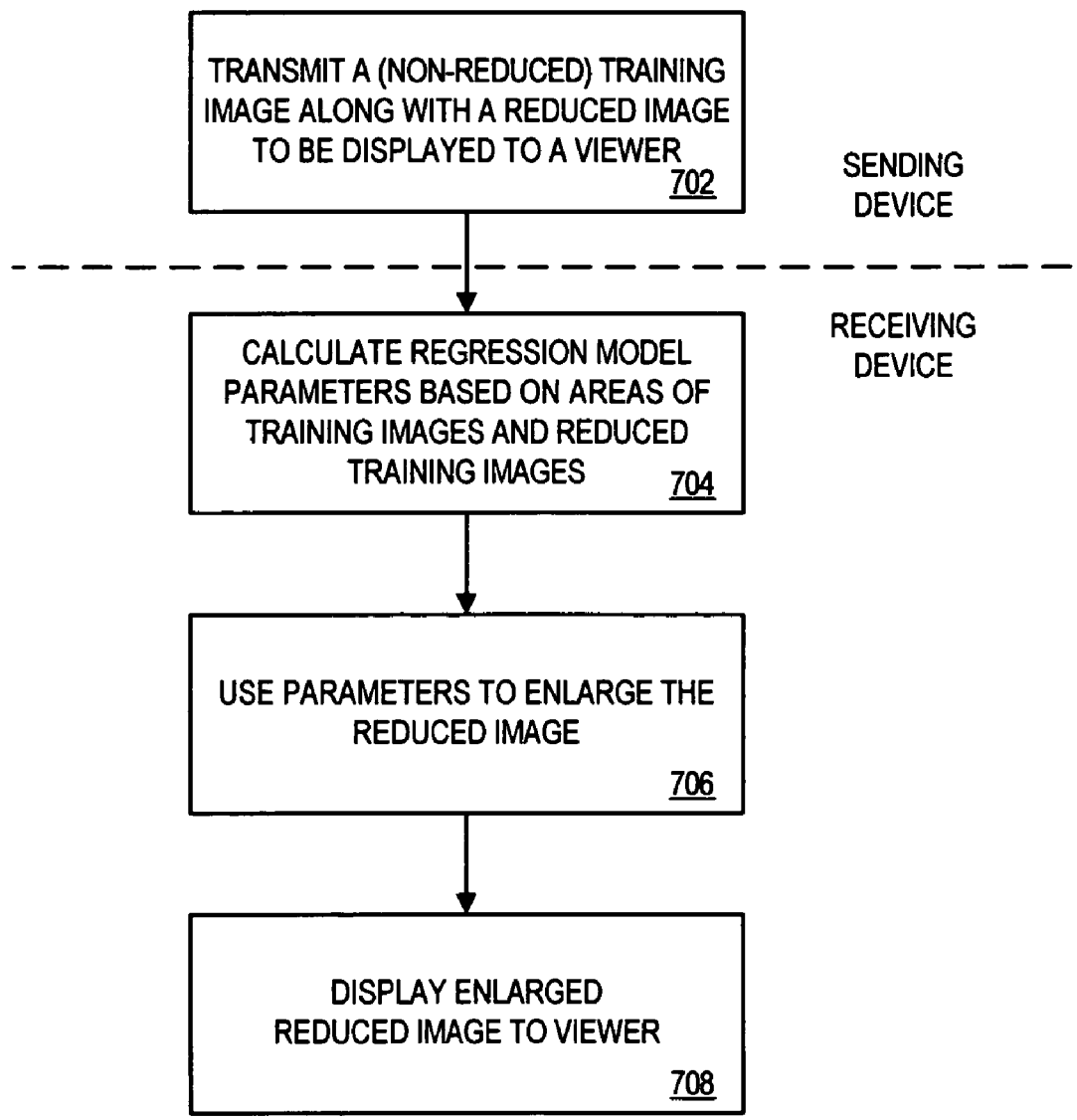
FIG. 7 is a flow chart of a method in which a training engine is associated with a receiving device according to some embodiments.

FIG. 7 is a flow chart of a method in which a training engine is associated with a receiving device according to some embodiments. At 702, a sending devices transmits a non-reduced training image to a receiving device along with other images that have been reduced. At 704, the receiving device calculates regression model parameters based on the full-sized training image and a reduced version of the training image. For example, the receiving device might compare features of the full-sized training image with corresponding features in the reduced version to generate an enlargement model.

At 706, the receiving device uses the enlargement parameters to up-scale the reduced images. The re-created full-sized version of the images can then be displayed to a viewer at 708.

Note that with any of the embodiments described herein, the enlargement parameters might be calculated in substantially real time (e.g., as video is streaming through a communication network). As another approach, the parameters might be calculated in advance of the transfer of images. For example, training parameters associated with a stationary surveillance camera might be calculated once and then be used to enlarge received images for an extended period of time (e.g., because the images will be very similar).

Because at least some of the images transmitted via the network have been scaled down (e.g., the non-training images), the amount information that needs to be transmitted may be reduced. For example, if an original image is scaled down Z times along each axis, the amount of information might be reduced by $Z^2$. Moreover, the use of enlargement parameters may prevent the quality of the image that is ultimately displayed to the viewer from being unacceptably degraded.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although a particular design for a training engine has been described herein, other designs may be used according to other embodiments. Similarly, other reduction, enlargement, and/or compression techniques may be used.

The several embodiments described herein are solely for the purpose of illustration. Persons skilled in the art will recognize from this description other embodiments may be practiced with modifications and alterations limited only by the claims.

What is claimed is:

1. A method, comprising:
   determining a set of images, each image having a pixel width and a pixel height, wherein the set includes at least one training image and at least one image to be provided to a viewer;
   creating, by a sending device or a receiving device, a reduced training image based on the training image, wherein at least one of the training image's pixel width or pixel height is reduced;
   calculating, by the sending device or the receiving device, at least one enlarging parameter based on a portion of the training image and a corresponding portion of the reduced training image;
   creating, by the sending device, a reduced image that is a scaled-down and lower-resolution version of one of the at least one image to be provided to the viewer;
   transmitting the reduced image from the sending device to the receiving device; and
   facilitating an enlargement of the reduced image based on the enlarging parameter and the reduced image;
   wherein the reduced image is other than the reduced training image;
   wherein the training image is an image in a video, and
   wherein the method further comprises selecting the image in the video as the training image when a new scene is detected in the video.

2. The method of claim 1, wherein said calculating is performed by the sending device, and said facilitating includes:
   transmitting the enlarging parameter from the sending device to the receiving device.

3. The method of claim 2, further comprising:
   compressing the reduced image before said transmitting.

4. The method of claim 1, wherein said calculating is performed by the receiving device, said determining comprises receiving the training image and the reduced image, and said facilitating includes:
   enlarging the reduced image based at least in part on the enlarging parameter.

5. The method of claim 4, further comprising:
   decompressing at least one of the training image or the reduced image.

6. The method of claim 4, farther comprising:
   providing the enlarged reduced image to the viewer.

7. The method of claim 1, farther comprising:
   removing low-band information from the training image before creating the reduced training image.

8. The method of claim 7 wherein said removing is associated with at least one of: (i) filtering, (ii) a Gaussian algorithm, or (iii) a laplacian pyramid algorithm.

9. The method of claim 1, wherein said calculating is associated with at least one of: (i) a regression model, (ii) a k-nearest neighbor algorithm, (iii) a Markov random field algorithm, or (iv) a gradient boosting tree algorithm.

10. The method of claim 1, further comprising:
    selecting the training image based at least in part on a class of images.

11. The method of claim 1, further comprising:
    selecting the portion of the training image and the corresponding portion of the reduced training image.

12. An apparatus, comprising:
    a storage device to store a set of images, each image having a pixel width and a pixel height, wherein the set includes at least one training image and at least one image to be provided to a viewer;
    a training engine to: (i) create a reduced training image based on the training image, wherein at least one of the training image's pixel width or pixel height is reduced, and (ii) calculate at least one enlarging parameter based on a portion of the training image and a corresponding portion of the reduced training image, wherein the enlarging parameter is to facilitate an enlargement of a reduced version of an image that will be provided to the viewer based on the enlarging parameter and the reduced version of the image to be provided to the viewer;
    wherein the reduced version of the image is a scaled-down and lower-resolution version of the image that will be provided to the viewer;
    wherein the reduced version of the image is other than the reduced training image;
    wherein the training image is an image in a video; and
    wherein the training engine is further to (iii) select the image in the video as the training image when a new scene is detected in the video.

13. The apparatus of claim 12, farther comprising:
    an output port to transmit the enlarging parameter to a receiving device.

14. The apparatus of claim 12, farther comprising:
    an input port to receive the enlarging parameter from a sending device.

15. An article, comprising:
    a storage medium having stored thereon instructions that when executed by a machine result in the following:

determining a set of pictures, wherein the set includes at least one training picture and at least one picture to be provided, creating a scaled-down training picture based on the training picture, developing a regression model based on a selected area of the training picture and a corresponding area of the scaled-down training picture, and facilitating a scaling-up of a reduced picture to be provided based on information associated with the regression model and the reduced picture to be provided;

wherein the reduced picture is a scaled-down and lower-resolution version of the picture to be provided;

wherein the reduced picture is other than the scaled down training image;

wherein the training picture is an image in a video, and wherein the instructions when executed by the machine further result in selecting the image in the video as the training picture when a new scene is detected in the video.

16. The article of claim 15, wherein the set of pictures are associated with at least one of: (i) a video conference, or (ii) a television program.

17. The article of claim 15, wherein a plurality of training pictures and associated scaled-down training pictures are used to develop the regression model.

18. A system, comprising:

a camera to generate a set of digital images;

a training engine to (i) create a reduced training image based on a training image, and (ii) calculate at least one parameter based on a selected area of the reduced training image, to facilitate a scaling-up of a scaled-down digital image to be provided to a viewer based on the parameter and the scaled-down digital image; and a reducing engine to create the scaled-down digital image, wherein the scaled-down digital image is a scaled-down and lower-resolution version of the digital image; and wherein the scaled-down digital image is other than the reduced training image;

wherein the training image is an image in a video; and wherein the training engine is further to (iii) select the image in the video as the training image when a new scene is detected in the video.

19. The system of claim 18, further comprising:

a display to provide the scaled-up, scaled-down image to the viewer.

20. The system of claim 18, wherein said training engine is associated with at least one of: (i) a personal computer, (ii) a set-top box, (iii) a media center, (iv) a game system, (v) a digital video recorder, or (vi) a television.

21. The method of claim 1, further comprising:

displaying the enlargement of the reduced image.

22. The method of claim 1, wherein creating the reduced image comprises:

scaling down the one of the at least one image to be provided to the viewer to create the reduced image that is a scaled-down and lower-resolution version of the one of the at least one image to be provided to the viewer.

23. The method of claim 22, wherein the reduced image is transmitted from the sending device to the receiving device.

24. The method of claim 23, further comprising:

compressing the reduced image before said transmitting.

25. The apparatus of claim 12, further comprising:

a reducing engine to scale down the image that will be provided to the viewer to create the reduced version that is a scaled-down and lower-resolution version of the image that will be provided to the viewer.

26. The article of claim 15, wherein the storage medium further has stored thereon instructions that when executed by the machine result in the following:

scaling down the picture to be provided to create the reduced picture that is a scaled-down and lower-resolution version of the picture to be provided.

27. The system of claim 18, wherein the reducing engine comprises:

a reducing engine to scale down the digital image to create the scaled-down digital image that is a scaled-down and lower-resolution version of the digital image.

* * * * *